3,361,785
ALDEHYDE-OLEFIN CONDENSATION PROCESS
James D. McClure, Amsterdam, Netherlands, assignor to Shell Oil Company, New York, N.Y., a corporation of Delaware
No Drawing. Filed Sept. 8, 1964, Ser. No. 395,063
11 Claims. (Cl. 260—465)

ABSTRACT OF THE DISCLOSURE

Aldehyde-olefin condensation products and triarylphosphine oxides are prepared by contacting aldehydes and olefins activated by the presence of an electron-withdrawing substituent, in the presence of substantially stoichiometric amounts of a triarylphosphine, in tertiary alkanol solution.

---

This invention relates to a process for reacting aldehydes with activated organic compounds. More particularly, it relates to a process for condensing aldehydes with olefinic compounds possessing an electron-withdrawing substituent on one carbon atom of the ethylenic linkage.

The term "condensation" as employed herein refers to the process of "condensing," i.e., reacting, two or more organic reactant molecules to form a single product molecule, typically by forming a new carbon-carbon bond and frequently with the elimination of water or some other simple atom or group of atoms. Many methods are available for condensing aldehydes with organic molecules activated by the presence within the molecule of an electron-withdrawing substituent, for example, the well-known aldol condensation and related reaction types as illustrated by the condensation of acetaldehyde with itself to produce crotonaldehyde or with ethyl malonate to produce ethyl ethylidenemalonate. Such condensations are typified by reaction of the carbonyl group of the aldehyde with the hydrogen substituents of the carbon atom alpha to the activating electron-withdrawing substituent, and the new carbon-carbon bond is formed between the carbonyl carbon atom of the aldehyde and this alpha carbon atom. To effect the condensation of an aldehyde and an activated compound through the beta carbon atom thereof is substantially more difficult, and few methods are available for effecting this type of condensation.

It is an object of the present invention to provide an improved process for condensing aldehydes with activated organic compounds. More particularly, it is an object to provide an improved process for condensing aldehydes with olefinic materials activated by the presence of an electron-withdrawing group as a substituent on one of the carbon atoms of the ethylenic linkage. A further object is to provide a process for effecting the condensation of aldehydes with such activated olefinic materials, which condensation involves the carbon atom of the activated olefin which is beta to the electron-withdrawing substituent.

It has now been found that these objects are accomplished by the process of reacting aldehydes with olefinic compounds possessing an electron-withdrawing group as a substituent on one carbon atom of the ethylenic linkage, in solution in polar solvent, in the presence of a tertiary aromatic phosphine. Under the conditions of the process of the invention, good yields of aldehyde-olefin condensation products are observed wherein the condensation has occurred between the carbonyl carbon atom of the aldehyde and the carbon atom of the olefinic compound which is beta to the electron-withdrawing substituent.

The aldehyde reactant is a mono- to poly-aldehyde, containing from 1 to 3 aldehyde, i.e., formyl, substituents and from 2 to 20 carbon atoms. The aldehyde is cyclic or acyclic, aliphatic or aromatic, and is a hydrocarbon aldehyde, that is, contains only atoms of carbon and hydrogen besides the oxygen atom(s) of the carbonyl group(s), or is a substituted hydrocarbon aldehyde containing non-hydrocarbyl groups which are unreactive under the conditions of the condensation process. Thus, aldehydes which contain substituents having active hydrogens, e.g., amino, hydroxy or carboxy groups, are not satisfactorily employed in the process of the invention.

Aliphatic aldehydes are saturated, e.g., are alkanals, or are ethylenically unsaturated, e.g., are alkenals, provided that any ethylenic unsaturation which is conjugated with a formyl group is not also terminal. Illustrative of such aldehydes are hydrocarbon aldehydes such as acetaldehyde, propionaldehyde, butyraldehyde, 2-ethylhexenal, crotonaldehyde, 4-hexenal, cyclohexane-carboxaldehyde, 3,4-diethylcyclopentane-carboxaldehyde, cyclohexene-4-carboxaldehyde, glutaraldehyde, malonaldehyde, 1,2-diformylcyclohexane, glyoxal, 1,3,5-triformylpentane and the like, as well as substituted hydrocarbon aliphatic aldehydes such as chloral, 2,2-dichloropropionaldehyde, 4-carbethoxybutanal, 2,3-dibromocyclohexane-carboxaldehyde, tetrahydropyran-2-carboxaldehyde, 3,4-dihydro-2H-pyran-2-carboxaldehyde, β-methoxypropionaldehyde and the like.

Aromatic aldehydes, which are preferably mononuclear aromatic aldehydes, include hydrocarbon aromatic aldehydes such as benzaldehyde, cinnamylaldehyde, o-tolualdehyde, p-tert-butylbenzaldehyde, phthalaldehyde, terephthaladehyde, 1,3,5-triformylbenzene and 3,4-dimethylbenzaldehyde, as well as substituted hydrocarbon aromatic aldehydes such as p-chlorobenzaldehyde, m-bromobenzaldehyde, p-carbomethoxybenzaldehyde, m-propoxybenzaldehyde, 3,4,5-trichlorobenzaldehyde, 4-carbethoxyphthalaldehyde and m-nitrobenzaldehyde.

Preferred aldehydes have from 2 to 10 carbon atoms and from 1 to 2 formyl substituents, and are preferably free from acetylenic unsaturation. Also preferred are hydrocarbon aldehydes or halo-substituted hydrocarbon aldehydes, generically designated (halo)hydrocarbon aldehydes, wherein the halogen(s) has (have) an atomic number from 17 to 35, i.e., the middle halogens chlorine and bromine. Further preferred are hydrocarbon monoaldehydes containing from 2 to 7 carbon atoms.

The activated olefinic compound comprises a single ethylenic linkage, i.e., a non-aromatic carbon-carbon double bond, one carbon atom of which possesses two hydrogen substituents and the other carbon atom of which possesses an electron withdrawing substituent. By the term "electron withdrawing substituent" is meant a functional group which, when attached to an aromatic ring is considered to be ring-deactivating and meta-directing. Illustrative of suitable electron-withdrawing groups are the nitro, cyano, carboalkoxy, acyl, sulfonyl and like groups which contain no active hydrogen atoms and up to 8 carbon atoms. Preferred activated olefinic compounds have from 2 to 10 carbon atoms and are represented by the formula

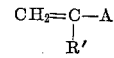

wherein A represents a cyano,

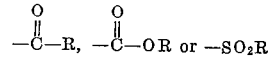

group wherein R is hydrocarbon containing no non-aromatic unsaturation, i.e., alkyl or aryl, having from 1 to 6 carbon atoms and R' is selected from hydrogen or R. Particularly preferred are the olefins of the above depicted formula wherein any R groups are alkyl and R' is hydrogen.

Exemplary activated olefinic compounds suitably employed in the process of the invention include acrylonitrile, methacrylonitrile, methyl acrylate, propyl acrylate, phenyl methacrylate, methyl vinyl ketone, propyl α-ethylvinyl ketone, butyl vinyl sulfone, hexyl vinyl sulfone, ethacrylonitrile, isopropenyl ethyl sulfone and the like.

The aldehyde and activated olefinic compound are mixed together in any convenient molar ratio. The probable stoichiometry of the reaction process requires that one mole of activated olefinic compound be present for each mole of aldehyde group, i.e., formyl group, as, for example, two moles of activated olefin may react with one mole of a difunctional aldehyde. Molar ratios of activated olefinic compound to aldehyde group from about 3:1 to about 1:3 are satisfactory, although it is frequently advantageous to employ a molar ratio of activated olefinic compound to aldehyde group that is substantially stoichiometric, that is, a molar ratio of about 1:1.

The condensation process of the invention is conducted in the presence of a tertiary aromatic phosphine, particularly a tertiary aromatic monophosphine. Particularly suitable tertiary aromatic phosphines are hydrocarbon phosphines, that is, contain only atoms of carbon, hydrogen and phosphorous. Preferred tertiary aromatic phosphines contain from 18 to 30 carbon atoms and are represented by the formula $PR''_3$ wherein $R''$ independently represents aryl, preferably mononuclear aryl, having from 6 to 10 carbon atoms. Although tertiary aromatic di- and tri-phosphines, or tertiary aromatic phosphines wherein the aryl phosphorous substituents are substituted hydrocarbyl are operable in the process of the invention, best results are obtained when triarylphosphines are employed, and, as previously stated, the use of such phosphines is preferred.

Illustrative of the preferred class of triarylphosphines are triphenylphosphine, tritolylphosphine, diphenylnaphthylphosphine, di(p-ethylphenyl)tolylphosphine, phenyldixylylphosphine, dinaphthylphenylphosphine, tri(p-tert-butylphenyl)phosphine and phenyltolylnaphthylphosphine. Best results are obtained when each aryl phosphorus substituent is mononuclear aryl, i.e., phenyl or substituted phenyl, and particularly preferred is triphenylphosphine.

Although the role of the phosphine in the process of the invention is not certain, it is apparent that the presence of greater than catalytic amounts of phosphine is required. Satisfactory results are obtained when the tertiary aromatic phosphine is employed in amounts at least equimolar with the limiting condensing species, that is, molar amounts at least equal to the moles of the activated olefinic compound or the moles of aldehyde group, whichever is smaller. Although greater amounts of phosphine may be employed, e.g., molar amounts up to about three times the molar amount of limiting condensing species, no apparent advantage is gained by the use of such an excess, and the use of molar amounts of the phosphine substantially equal to the amount of limting condensing species is preferred.

The condensation is effected in liquid-phase solution in a polar solvent, i.e., a solvent possessing uneven charge distribution. Although polar solvents that are liquid at reaction temperature and pressure and are substantially inert toward the aldehyde and olefinic reactants and the products produced therefrom are generally satisfactory, substantial benefit is obtained when the solvent employed is an alcohol, particularly a hydrocarbon monohydroxylic alcohol having up to 10 carbons. The role of the hydroxylic solvent in the process of the invention is not clearly understood. Without wishing to be bound by any specific theory, it appears that alcohol solvents, in addition to serving as the reaction medium, participate in the reaction process by supplying available hydrogen ions which serve to minimize the production and propagation of reactant chains that would result in the formation of polymeric product. The use of hydroxylic solvents thus enables a higher reaction temperature to be employed than when aprotic solvents are utilized and yet retain greater selectivity for the desired condensation process while retarding the tendency for polymer formation normally associated with reactions of activated olefinic materials at elevated temperature. At the elevated temperature employed in the process, rapid rates of reaction and short reaction times are made possible.

However, primary alcohols, and to a lesser extent secondary alcohols, have a tendency to undergo addition across the ethylenic linkage of the activated olefinic compound and although primary and secondary alcohols such as methanol, ethanol, isopropanol, benzyl alcohol and sec-butanol may be utilized, the advantages obtained by the use of such solvents are somewhat offset by the side reaction of solvent addition. Best results are obtained when the alcohol employed is a tertiary hydrocarbon alcohol. The use of such tertiary hydrocarbonols offers the advantages of an alcoholic solvent with a lessened tendency for solvent addition. Thus, tertiary hydrocarbonols are substantially inert with regard to solvent addition, but are active in the sense of retarding polymerization of reactant molecules. Suitable tertiary hydrocarbonols have from 4 to 10 carbon atoms and are free from non-aromatic unsaturation. Illustrative of such hydrocarbonols are tert-butyl alcohol, tert-amyl alcohol, methyl diethyl carbinol, triethyl carbinol, phenyl dimethyl carbinol and phenyl methyl ethyl carbinol. Preferred tertiary hydrocarbonols are tertiary alkanols, and most preferred as solvent is tertiary butyl alcohol.

The reaction solvent is generally employed in molar excess over the aldehyde or activated olefinic reactants, and molar ratios of solvent to limiting condensing species from about 2:1 to about 50:1 are satisfactory.

The condensation process is effected by mixing the aldehyde, activated olefinic compound and phosphine in the reaction solvent and maintaining the reaction mixture at a somewhat elevated temperature until reaction is complete. The method of mixing is not material. One reactant may be added to the others in increments although it is equivalently useful to initially mix the entire amount of reactants. The condensation process is conducted at temperatures as low as about 80° C. or as high as about 275° C., although reaction temperatures from about 100° C. to about 250° C. are preferred. The condensation is conducted at any convenient pressure, so long as the reaction mixture is maintained in the liquid phase. Advantageous use is made of the pressures generated by the reaction mixture when heated to reaction temperature in a sealed reactor, which pressures will be somewhat but not substantially higher than atmospheric pressure, e.g., from about 2 to about 20 atmospheres.

The condensation process is preferably conducted in an inert atmosphere, e.g., under an inert gas such as nitrogen, helium, argon or the like, and is preferably conducted under substantially anhydrous conditions. Although small amounts of water, e.g., up to about 1–2% of the reaction mixture may be tolerated without losing the advantages of the process of the invention, the yields of product are somewhat lower when moisture is present.

It is sometimes desirable to include within the reaction mixture a small amount of an inhibitor in order to retard the deleterious effects of trace amounts of oxygen and other oxidizing agents. Conventional inhibitors such as hydroquinone, 2,6-di-tert-butyl-4-methylphenol, chloranil and the like are satisfactory. If an inhibitor is to be employed, and none is required, only small amounts are necessary, e.g., from about 0.01 to about 0.5 mole percent based on total reactants.

Subsequent to reaction, the product mixture is cooled and the products are separated and recovered by conventional methods such as fractional distillation, fractional crystallization, selective extraction and the like.

The products of the process of the invention are condensation products of the aldehyde and the activated olefinic material wherein the condensation has taken place between the carbonyl carbon atom(s) of the aldehyde and the ethylenic carbon atom of the activated olefinic compound which is beta to the electron-withdrawing substituent. For example, the condensation of benzaldehyde and acrylonitrile is illustrated by the equation below.

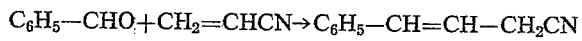

It should be noted that the major product, as is illustrated, contains ethylenic unsaturation that is $\beta,\gamma$- to the original electron-withdrawing group in contrast to the ethylenic unsaturation in the activated olefinic reactant which was $\alpha,\beta$- to the electron-withdrawing substituent. There are observed, however, lesser amounts of product wherein the ethylenic unsaturation remains $\alpha,\beta$- to the electron-withdrawing group, e.g., in the above-depicted reaction 1-cyano-3-phenyl-1-propene is also observed as product. No moiety of the phosphine is found in the condensed product, but instead the phosphine is recovered as the corresponding phosphine oxide. Other typical reaction products include 4-octen-2-one as well as lesser amounts of 3-octen-2-one from the condensation of butyraldehyde and methyl vinyl ketone, methyl 4-(p-chlorophenyl)-3-butenoate and lesser amounts of methyl 4-(p-chlorophenyl)-2-butenoate from condensation of p-chlorobenzaldehyde and methyl acrylate, 1,6-dicyano-2,4-hexadiene with lesser amounts of 1,6-dicyano-1,5-hexadiene from the condensation of acrylonitrile and glyoxal, and phenyl 2,5-heptadienyl sulfone with lesser amounts of phenyl 1,5-heptadienyl sulfone from the condensation of phenyl vinyl sulfone and 3-pentenal.

The products of the process of the invention find numerous utilities, particularly as chemical intermediates. The ethylenic unsaturation may, for example, be hydrated or hydroxylated to form alcohols from which useful ester or ether derivatives are prepared. The nitriles produced by the process of the invention are reduced to corresponding amines or amides, and together with the ester products may be hydrolyzed to form useful carboxylic acids. The ethylenic linkages present in the product molecule serve as a reactive site for polymerization or copolymerization with other unsaturated monomers, and additionally the unsaturated products may be epoxidized to form useful epoxy resin precursors.

To further illustrate the process of the invention, the following examples are provided. It should be understood that the details thereof are not to be regarded as limitations, as they may be varied as will be understood by one skilled in this art.

Example I

To a glass-lined reactor was charged 39.3 g. (0.15 mole) of triphenylphosphine, 8.0 g. (0.15 mole) of acrylonitrile, 8.7 g. (0.15 mole) of propionaldehyde, 0.1 g. of hydroquinone and 80 g. of tertiary butyl alcohol. The reaction mixture was sealed under nitrogen and maintained at 175±1° C. for 8 hours. The product mixture, which was diluted with benzene to facilitate transfer, contained no insoluble polymer. Solvent and unreacted acrylonitrile and propionaldehyde were removed by fractional distillation. The amounts of recovered reactants evidence a 60% conversion to product.

Continued distillation of the product mixture afforded a first fraction of 7.0 g., B.P. 48–55° C. at 10–15 mm., a second fraction of 2.1 g., B.P. 65–100° C. at 0.5–1 mm., and 42 g. of crystalline bottoms product. Analysis of the first fraction by gas-liquid chromatography indicated that the fraction contained 88% 1-cyano-2-pentene, which represented a 70% yield based upon acrylonitrile converted. The second fraction, upon similar analysis was found to contain 8% 1-cyano-2-pentene. Fractional distillation of fraction 1 afforded 5.2 g. of 98% pure 1-cyano-2-pentene, B.P. 72–73° C. at 30 mm. The elemental analysis was as follows:

*Analysis.*—Calc.: C, percent wt., 75.8; H, percent wt., 9.54; N, percent wt., 14.7; molecular wt., 95. Found: C, percent wt., 75.5; H, percent wt., 9.7; N, percent wt., 14.4; molecular wt., 95.

The crystalline bottoms product from the initial distillation was found to be triphenylphosphine oxide, M.P. 153–155° C. and unreacted triphenylphosphine.

Example II

To a glass-lined reactor was charged 5.39 g. (0.1 mole) of acrylonitrile, 26.2 g. (0.1 mole) of triphenylphosphine, 10.8 g. (0.1 mole) of benzaldehyde, 0.1 g. of hydroquinone and 80 g. of tertiary butyl alcohol. The reaction mixture was sealed under nitrogen and maintained at 175±2° C. for 8 hours. Solvent and unreacted acrylonitrile were removed from the resulting product mixture by distillation at reduced pressure. Gas-liquid chromatographic analysis of the distillate indicated that 66% of the charged acrylonitrile had been converted to products.

Recrystallization of the distillation residue from an ethyl acetate-hexane mixture afforded 12.0 g. of triphenylphosphine oxide, M.P. 153–155° C. The filtrate from the recrystallization was fractionally distilled under reduced pressure to yield several fractions containing isomeric mixtures of phenyl-cyano-propenes; the principal component, 3.6 g., was 3-cyano-1-phenyl-1-propene. The trans isomer was separated and recrystallized from 90% hexane −10% benzene to give 2.5 g. of white plates, M.P. 59–60° C. The elemental analysis was as follows:

*Analysis.*—Calc.: C, percent wt., 83.8; H, percent wt., 6.35; N, percent wt., 9.80; molecular wt., 143. Found: C, percent wt., 83.5; H, percent wt., 6.40; N, percent wt., 9.60; molecular wt., 143.

Example III

A solution of 39.3 g. (0.15 mole) of triphenylphosphine, 8.0 g. (0.15 mole) of acrylonitrile, 10.9 g. (0.15 mole) of crotonaldehyde and 0.05 g. hydroquinone in 120 g. of tertiary butyl alcohol was charged to a glass-lined reactor and was maintained under nitrogen at 175±2° C. for 7 hours. No insoluble polymer was formed. Solvent and unreacted acrylonitrile and crotonaldehyde were removed by fractional distillation at atmospheric pressure to give a partially crystalline residue of 47 g. Analysis of the distillate indicated a 50% conversion of the acrylonitrile and a 75% conversion of crotonaldehyde to products. The partially crystalline residue was recrystallized from ethyl acetate to give white crystals of triphenylphosphine oxide and a filtrate which was fractionally distilled to yield two fractions which were principally 1-cyano-1,3-hexadiene and 1-cyano-2,4-hexadiene. Product identification was made from the infrared and nuclear magnetic resonance spectra. The isomer present in the major amount, 3.13 g., was 1-cyano-2,4-hexadiene.

Example IV

A Solution of 8.5 g. (0.16 mole) of acrylonitrile, 42 g. (0.16 mole) of triphenylphosphine, 10.8 g. (0.08 mole) of terephthaldehyde and 0.05 g. hydroquinone in 120 g. of tertiary butyl alcohol was maintained, under nitrogen, in a glass-lined reactor at 173–175° C. for 10 hours. The resulting product mixture was diluted with benzene and filtered to remove about 4–5 g. of red, benzene-insoluble resin. The volatile material was removed under reduced pressure to yield 52 g. of a partially crystalline residue. The residue was crystallized from ethyl acetate and from ethyl acetate-hexane to give 25 g. of triphenylphosphine oxide. The filtrate therefrom was crystallized from a benzene-hexane mixture to give 1 g. of 1,4-bis(3-cyano-1-propenyl)benzene which melted at 153–156° C. after recrystallization from ethyl acetate. The nuclear magnetic resonance spectrum was consistent with the above formula. The elemental analysis was as follows:

*Analysis.*—Calc.: C, percent wt., 80.7; H, percent wt., 5.79; N, percent wt., 13.4; molecular wt., 208. Found: C, percent wt., 80.5; H, percent wt., 5.9; N, percent wt., 12.8; molecular wt., 208.

*Example V*

By a procedure similar to that of III, 26.2 g. (0.1 mole) of triphenylphosphine, 11.0 g. (0.1 mole) of benzaldehyde, 10.0 g. of ethyl acrylate and 0.05 g. of hydroquinone was reacted at 176–183° C. for 8 hours. The product mixture was separated by fractional distillation to give, inter alia, a mixture of isomeric ethyl 4-phenylbutenoates, the principal component of which, 3.01 g., was ethyl 4-phenyl-3-butenoate. The element analysis was as follows:

*Analysis.*—Calc.: C, percent wt., 75.8; H, percent wt., 7.4; Molec. wt., 190. Found: C, percent wt., 75.9; H, percent wt., 7.4; Molec. wt., 190.

Similar results are obtained when tritolylphosphine is employed in place of the triphenylphosphine.

*Example VI*

When butyl vinyl ketone is reacted with 4-bromo-3-methylbenzaldehyde in tertiary amyl alcohol solution in the presence of diphenylxylylphosphine under reaction conditions similar to those of Example V, a good yield of 1-(4-bromo-3-methylphenyl)-1-octen-4-one is obtained. Also observed as product is 1-(4-bromo-3-methylphenyl)-2-octen-3-one.

I claim as my invention:

1. The process of preparing aldehyde-olefin condensation products and triarylphosphine oxides, said condensation being between (1) at least one carbonyl carbon atom of an otherwise hydrocarbon aldehyde selected from aliphatic aldehyde, mononuclear aromatic aldehyde, halo-substituted aliphatic aldehyde, and halo-substituted mononuclear aromatic aldehyde wherein any halogen substituents are halogen of atomic number from 17 to 35 inclusive, said aldehyde having from 1 to 2 formyl substituents and from 2 to 10 carbon atoms, being free from terminal ethylenic unsaturation conjugated with a formyl substituent and being free from acetylenic unsaturation, and (2) the beta ethylenic carbon atom of activated olefinic compound of from 2 to 10 carbon atoms and represented by the formula

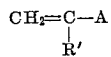

wherein A is selected from the group consisting of cyano,

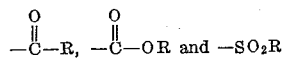

wherein R is hydrocarbon of from 1 to 6 carbon atoms and is free from non-aromatic unsaturation and R' is selected from the group consisting of hydrogen and R; by reacting said aldehyde with said activated olefinic compound in the presence of triarylphosphine wherein the aryls independently are hydrocarbon mononuclear aryl of from 6 to 10 carbon atoms and the triarylphosphine is present in proportions substantially equimolar to the formyl substituents, in solution in tertiary alkanol of 4 to 10 carbon atoms, at a temperature of from about 80° C. to about 275° C.

2. The process of claim 1 wherein A is cyano.

3. The process of claim 1 wherein A is

4. The process of preparing aldehydeolefin condensation products and triarylphosphine oxides wherein condensation takes place between (1) carbonyl carbon atom of hydrocarbon mono-aldehyde of from 2 to 7 carbon atoms, free from terminal ethylenic unsaturation conjugated to the formy group and free from acetylenic unsaturation, and (2) the beta ethylenic carbon atom of activated olefinic compound of from 2 to 10 carbon atoms and represented by the formula $$CH_2=CH-A$$

wherein A is selected from the group consisting of cyano,

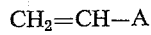
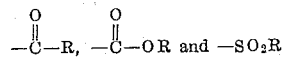

wherein R is alkyl of 1 to 6 carbon atoms, by reacting said monoaldehyde with said activated olefinic compound in the presence of triarylphosphine wherein the aryls independently are hydrocarbon mononuclear aryl of from 6 to 10 carbon atoms and the triarylphosphine is present in proportions substantially equimolar to said mono-aldehyde, in tertiary butyl alcohol solution at a temperature from about 80° C. to about 275° C.

5. The process of preparing aldehyde-olefin condensation products and triphenylphosphine oxide by reacting hydrocarbon monoaldehyde of from 2 to 7 carbon atoms, free from terminal ethylenic unsaturation conjugated with the formyl group and free from acetylenic unsaturation, with acrylonitrile in the presence of triphenylphosphine, said triphenylphosphine being present in proportions substantially equimolar to the mono-aldehyde, in tertiary butyl alcohol solution at a temperature from about 100° C. to about 250° C.

6. The process of claim 5 wherein the aldehyde is benzaldehyde.

7. The process of claim 5 wherein the aldehyde is crotonaldehyde.

8. The process of preparing aldehyde-olefin condensation products and triphenylphosphine oxide by reacting hydrocarbon monoaldehyde of from 2 to 7 carbon atoms, free from terminal ethylenic unsaturation conjugated with the formyl group and free from acetylenic unsaturation, with alkyl acrylate wherein the alkyl is alkyl of from 1 to 6 carbon atoms in the presence of triphenylphosphine, said triphenylphosphine being present in proportions substantially equimolar to the mono-aldehyde, in tertiary butyl alcohol solution at a temperature from about 100° C. to about 250° C.

9. The process of claim 8 wherein the aldehyde is propionaldehyde.

10. The process of claim 9 wherein the acrylate is ethyl acrylate.

11. The process of claim 9 wherein the acrylate is methyl acrylate.

References Cited

UNITED STATES PATENTS 3,225,082  12/1965  McClure _____ 260—465

CHARLES B. PARKER, *Primary Examiner.*

D. H. TORRENCE, *Assistant Examiner.*